C. F. COLBERT.
FILLING MACHINE.
APPLICATION FILED FEB. 24, 1908.
983,351.
Patented Feb. 7, 1911.
6 SHEETS—SHEET 1.
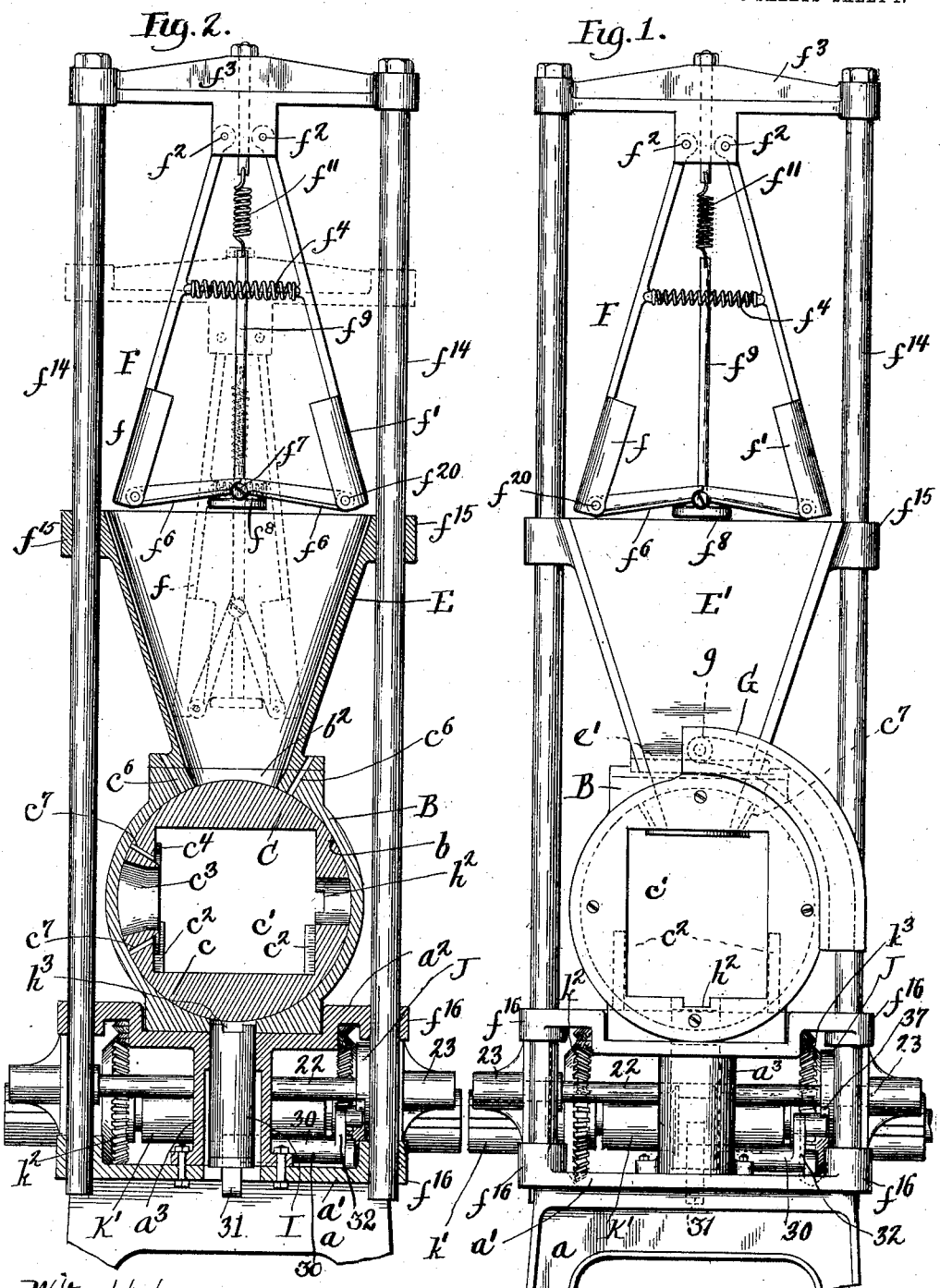

C. F. COLBERT.
FILLING MACHINE.
APPLICATION FILED FEB. 24, 1908.
983,351.
Patented Feb. 7, 1911.
6 SHEETS—SHEET 2.
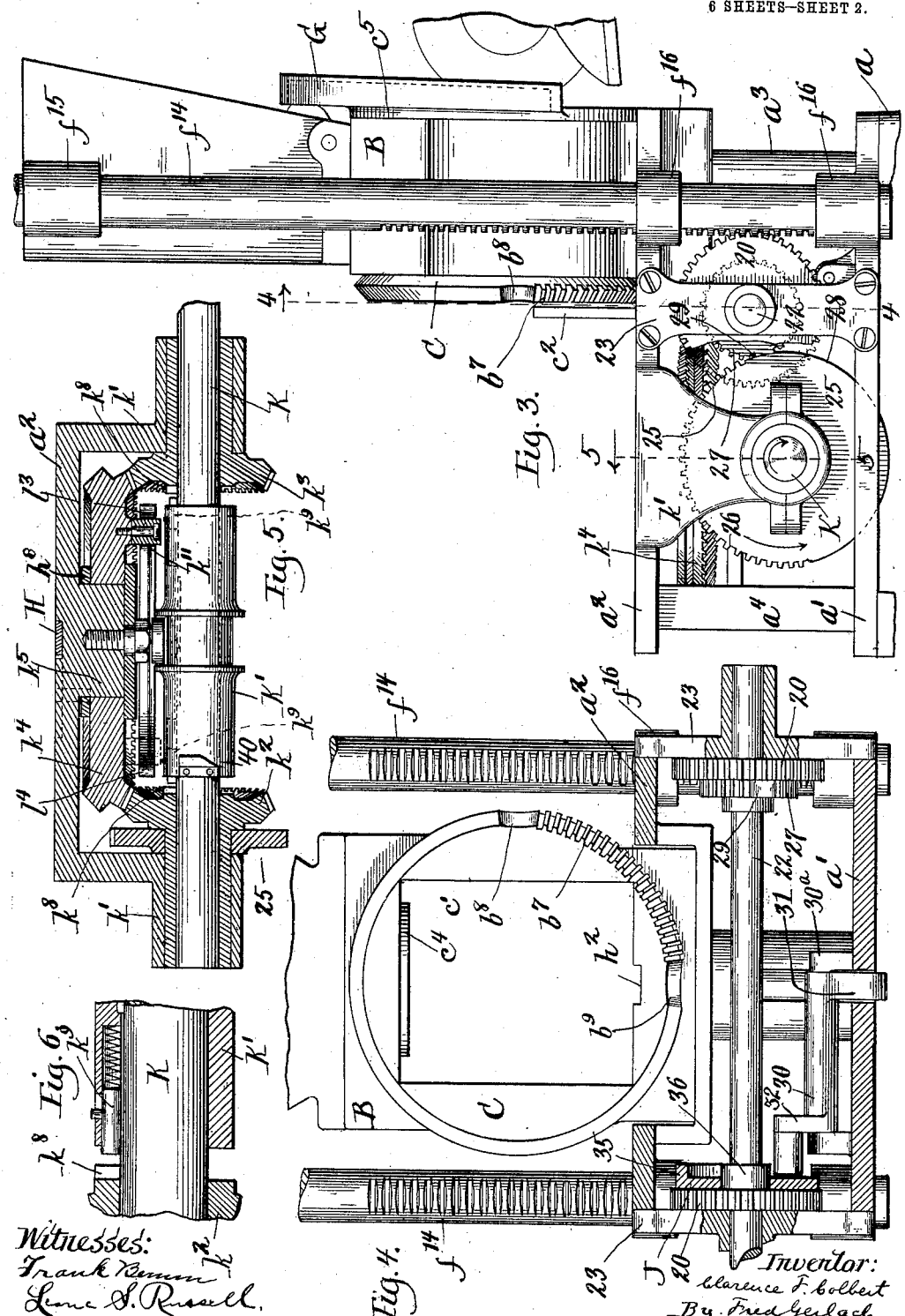
Witnesses:
Frank Bemm
Leone S. Russell
Inventor:
Clarence F. Colbert
By Fred Gerlach
his Attorney

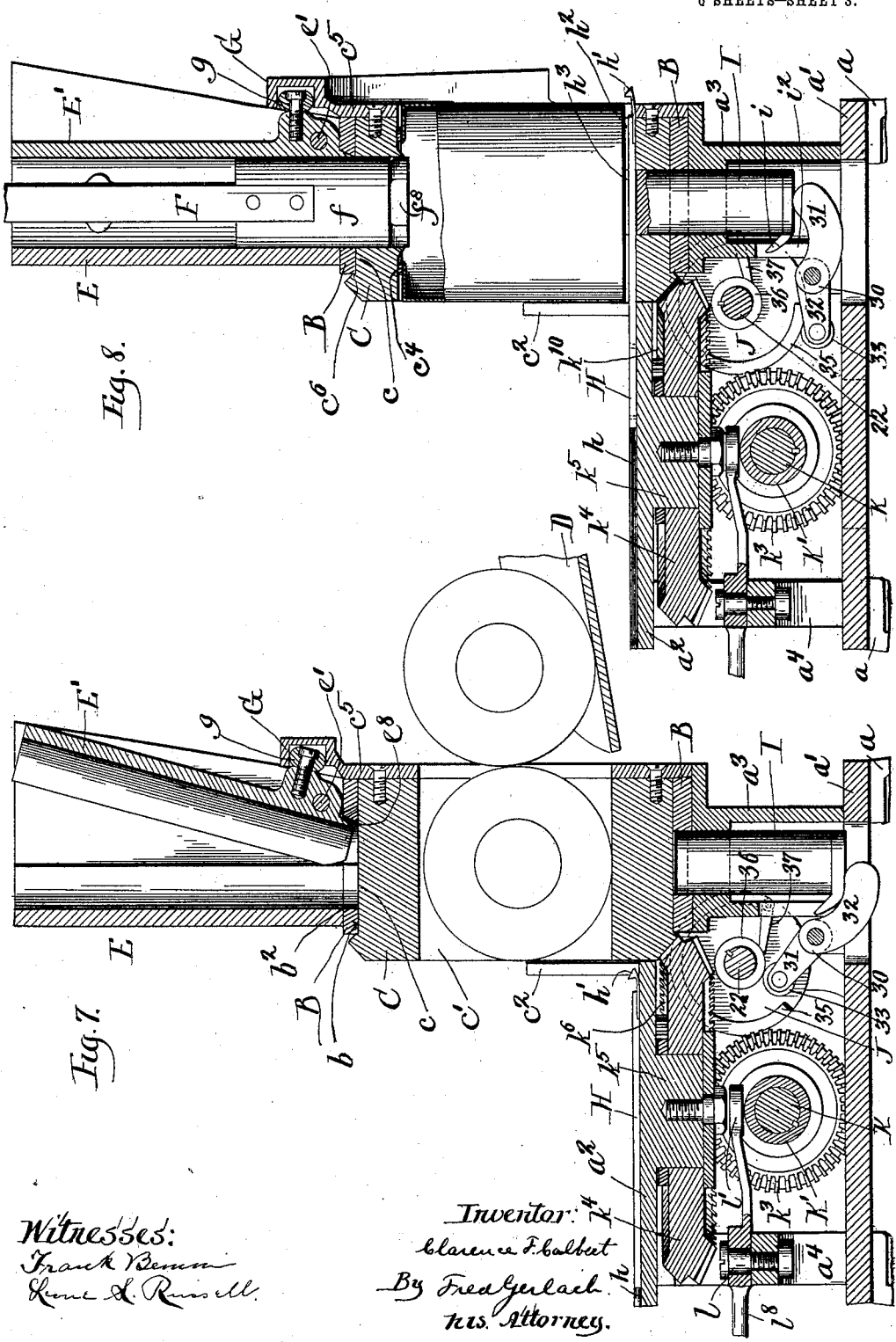

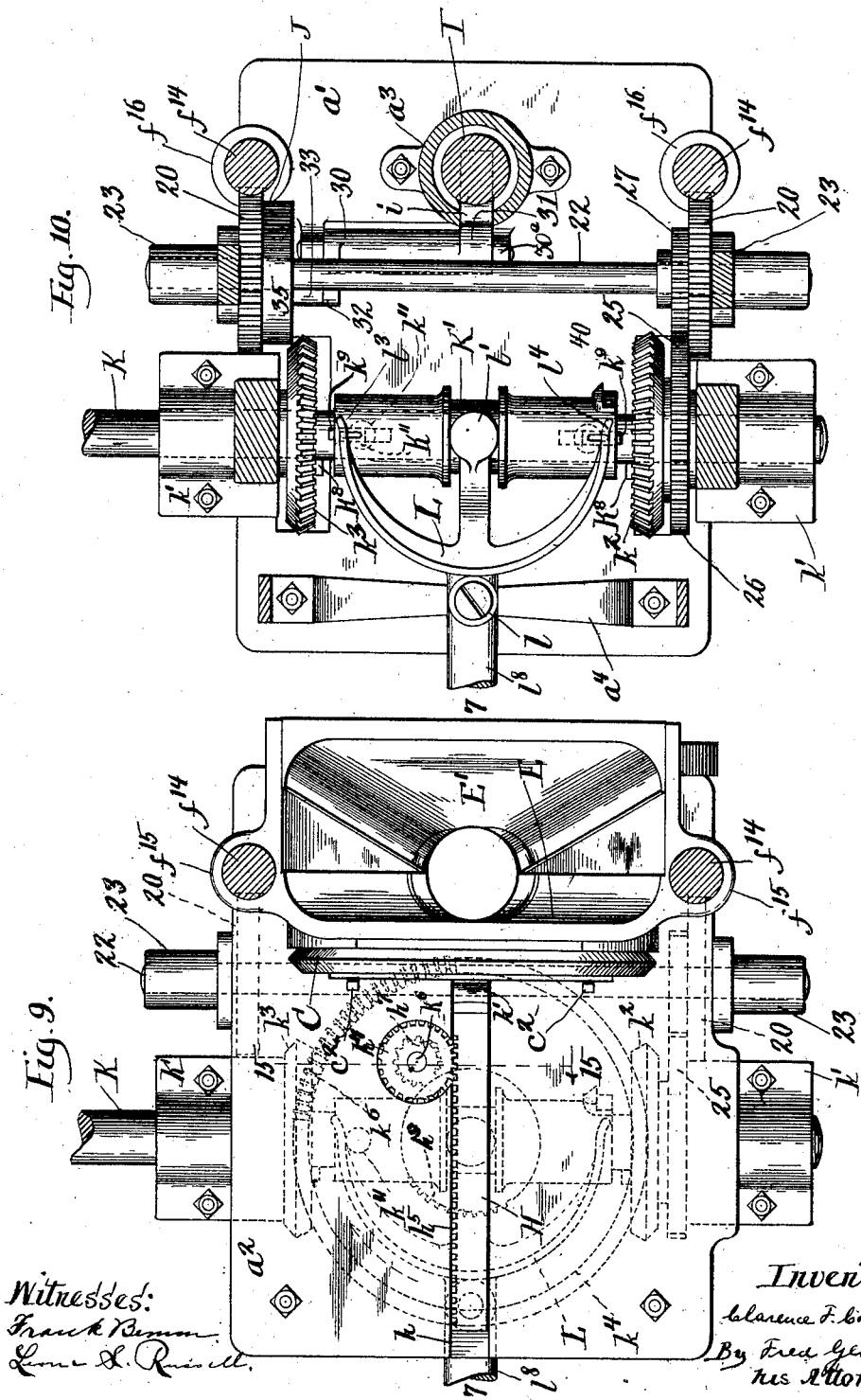

C. F. COLBERT.
FILLING MACHINE.
APPLICATION FILED FEB. 24, 1908.
983,351.
Patented Feb. 7, 1911.
6 SHEETS—SHEET 5.
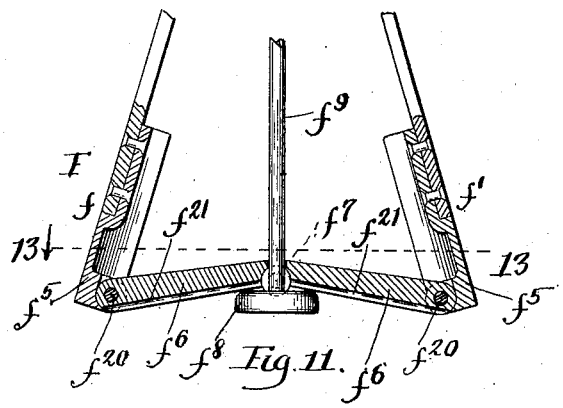
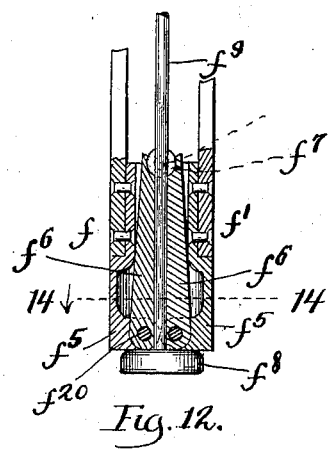
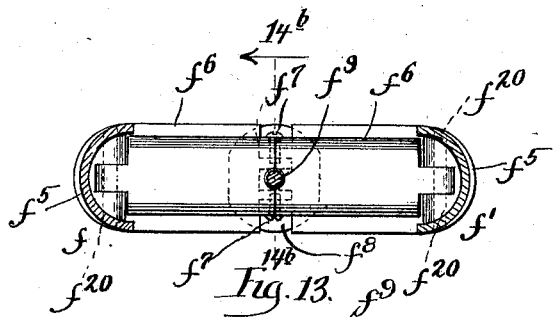
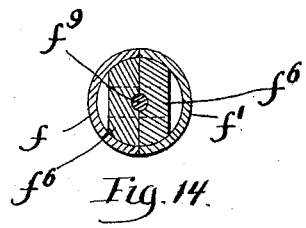
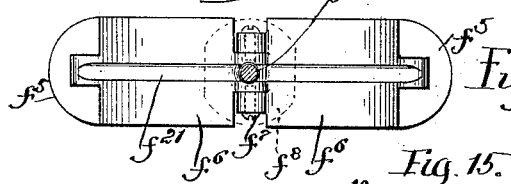
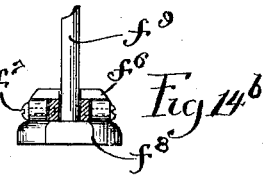
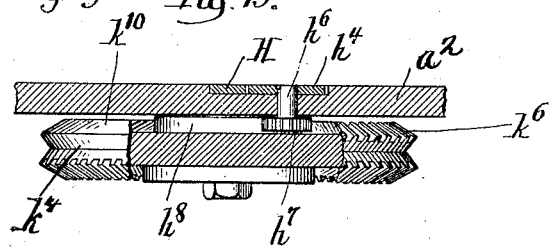
Witnesses:
Frank Bemm
Leone L. Russell
Inventor:
Clarence F. Colbert
By Fred Gerlach
his Attorney.

C. F. COLBERT.
FILLING MACHINE.
APPLICATION FILED FEB. 24, 1908.
983,351.
Patented Feb. 7, 1911.
6 SHEETS—SHEET 6.
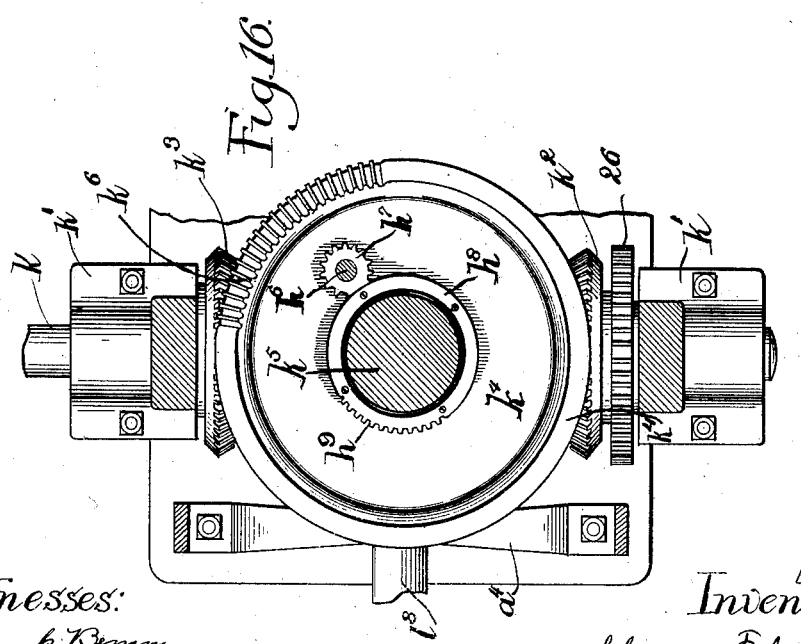
Witnesses:
Frank Bemm
Leone S. Russell
Inventor:
Clarence F. Colbert
by Fred Gerlach
his Atty.

UNITED STATES PATENT OFFICE.

CLARENCE F. COLBERT, OF OAK PARK, ILLINOIS.

FILLING-MACHINE.

983,351.  Specification of Letters Patent.  Patented Feb. 7, 1911.

Application filed February 24, 1908. Serial No. 417,326.

*To all whom it may concern:*

Be it known that I, CLARENCE F. COLBERT, a resident of Oak Park, in the county of Cook and State of Illinois, have invented certain new and useful Improvements in Filling-Machines, of which the following is a full, clear, and exact description.

The invention relates to filling-machines and more particularly to that type in which the material with which the can or package is to be filled has both liquid and solid constituents, *e. g.*, tomatoes, mince-meat, vegetables or fruit. In packaging this class of materials, it is desirable to force a measured charge of material into the can to expedite the filling-operation and to cause displacement of any solid or slow-flowing constituent into the package, and one object of the present invention is to provide improved means for forcing a charge into the package.

In packaging vegetables or fruit, *e. g.*, tomatoes, it is sometimes desirable to use a can or package, the top of which has a mouth or opening considerably smaller than the diameter of the can, which can be more readily sealed and makes it possible to provide a closure at a lower cost than when the can has a large opening and closed by a corresponding cap, and the invention designs to provide an improved device or mechanism for forcing a charge of material through the small mouth of such a can.

The invention further designs to provide improved mechanism for manipulating the package into position to be filled, improved mechanism for discharging the can or package after it has been filled, and improved mechanism for holding the can in position to be filled.

The invention consists in the several novel features hereinafter set forth and more particularly defined by claims at the conclusion hereof.

In the drawings: Figure 1 is an end view of a machine embodying the invention, the can carrier or holder being shown in position assumed when a can is being filled. Fig. 2 is a vertical transverse section through the hopper, the can-holder or carrier being shown in normal position to receive a can. Fig. 3 is a side elevation. Fig. 4 is a section on line 4—4 of Fig. 3. Fig. 5 is a section on line 5—5 of Fig. 3. Fig. 6 is a detail view of one of the clutch-pins. Fig. 7 is a central longitudinal section on line 7—7 of Fig. 9, the parts being shown in normal position. Fig. 8 is a similar view, the parts being shown in operative position while a charge is being forced into the can. Fig. 9 is a plan view, the plunger being omitted. Fig. 10 is a similar view with the table and superposed parts removed, parts being shown in section. Fig. 11 is a detail section through the contractible plunger, the members thereof being shown in spread relation. Fig. 12 is a similar view with the parts shown in closed or contracted relation. Fig. 13 is a section on line 13—13 of Fig. 11. Fig. 14 is a section on line 14—14 of Fig. 12. Fig. 15 is a section on line 15—15 of Fig. 9, showing the gear for operating the ejector. Fig. 16 is a plan of carrier-operating gear.

The machine may be mounted in any suitable manner, *e. g.*, on standards $a$ whereon is secured a frame $a'$. A table $a^2$ is secured above the frame $a'$ by a post $a^3$ and a cross-frame $a^4$. The mechanism for operating the several parts of the machine is supported by and mounted between said frame and table.

A carrier-guide or frame B is secured on table $a^2$ and is formed with a cylindrical seat $b$ wherein a revoluble package-holder or carrier C is journaled. Said carrier is provided with a cylindrical body $c$ fitting snugly and journaled in a correspondingly shaped seat $b$ in the carrier-guide B, and has a rectangular opening $c'$ extending therethrough from end to end. The carrier is adapted to receive a can or package from a suitable track or run-way D when it is in its normal or one of its alternative positions, and is adapted to turn the can from horizontal into vertical position to bring the opening in the top of the can into position beneath the hopper containing the material to receive a charge of material. The run-way D is arranged so that when the can-carrier is in normal position, a can will roll into the rectangular opening $c'$ of the carrier, being held therein by stops $c^2$ on table $a^2$. An opening $c^3$ extends from opening $c'$ in the carrier to the outer periphery thereof, so that the carrier which rotates in frame B operates as a cut-off for the material and closes the bottom of the container or hopper, except when the carrier is holding a can in position to receive a charge of material from the hopper. A plate $c^5$ secured to one end of the carrier C and a shoulder $c^6$ at the other end confine the carrier against longitudinal movement in guide B.

The invention designs to provide mechanism for forcing the material into a package or can and this mechanism comprises a hopper or container E provided with a movable wall or member E' which is pivoted on a pin $e'$ secured in the stationary portion of the hopper. The side-walls of the stationary hopper-section are extended so that when the movable wall is swung outwardly the material will be held within the hopper. The lower end of the hopper-wall E' is pivoted so that the upper end may be swung outwardly into convenient position to quickly receive a charge of material from the measuring-device usually provided. When a charge of material has been delivered into the hopper the pivoted wall E' is swung into position so it will be substantially parallel to the opposite side wall of the stationary member E. The side-walls of the hopper are flared or inclined upwardly so that the material being forced therethrough will be compressed in transit to the can, if necessary to force any of the material through the reduced lower end of the hopper and through the can-mouth.

An expansible and contractible plunger F is provided for forcing the material through the inclined hopper into the can. Said plunger comprises a pair of laterally movable members $f, f'$, each of which is pivotally sustained at its upper end, as at $f^2$, in a cross-head $f^3$ which serves as a movable plunger-support. The plunger-members are normally pressed apart or yieldingly held in spread relation by one or more springs $f^4$ which extend between said members. To the head-section $f^5$ of each of the plunger-members, is pivoted, as at $f^{20}$ a link $f^6$ respectively and the inner ends of said links are pivotally connected together by pins $f^7$. These links together with the heads $f^5$ form or constitute a collapsible head which, as it is operated through the hopper adjusts itself to fit across the hopper and between the inclined walls thereof to form a closure which confines the material beneath the plunger and forces the material into the can. To prevent the jointed piston-head from passing the dead-center of the linkage, a stop $f^8$ is secured to the lower end of a rod $f^9$, which is yieldingly suspended from the plunger-supporting cross-head $f^3$, by a spring $f''$. The lower corners of each of the head-sections of the plunger-members are extended inwardly to fit against the ends of links $f^6$ respectively, and form a closure there which prevents escape of the material through the head. The joint between links $f^6$ is formed so as to prevent escape of the material there, and these links are adapted to fold into substantially parallel relation within the plunger-members $f, f'$ as illustrated in Fig. 12, and their lower faces are grooved as at $f^{21}$ to clear the stop-rod $f^9$. The stop $f^8$ limits the outward movement of the plunger-members and forces any solid material downwardly and prevents any material quantity thereof from passing between the links as the plunger is being contracted. The spring $f''$ also permits the stop $f^8$ to be forced downwardly by the links and beneath the head-sections $f^5$ so it will lie thereunder to permit the sections to be folded together so the plunger-head can be forced entirely through the hopper and into the can. This self-adjusting plunger makes it possible to quickly force or displace the measured charge of material, in its entirety, from the hopper into the can, the flaring tapered hopper causing the plunger to be contracted as the latter is operated through the hopper. An important resultant advantage of this device is that the entire charge is quickly displaced into the can. The invention thus provides a flaring hopper adapted to receive a charge of material and a contractible plunger adapted to force the material downwardly through the small end of the hopper and to compress the material sufficiently to cause it to pass into a small-mouthed can. This mechanism is well adapted for filling tomatoes, it being desirable to force the fruit into the can without unnecessary disintegration. The carrier-guide B is provided with an opening $b^2$ registering with the lower end of the hopper, through which the plunger passes to the orifice $c^3$ in the carrier, to force the material into the can. The lower end of gate E' has a lip $c^8$ adapted to extend into said orifice of the gate.

The movable wall or gate E' of the hopper is operated into and out of closed position by a cam G which is rigidly secured to plate C' of the can-carrier and rotates therewith. A stud $g$ is eccentrically secured to the gate E' and is adapted to travel in a groove in said cam and said groove is shaped so that when the can-carrier is in position to receive a can, the hopper-gate will be in open position to facilitate delivery of a charge of material into the hopper. When the can-carrier is oscillated, approximately through an arc of ninety degrees, to bring the top of the can and opening $c^3$ into position beneath the hopper, the gate E' of the hopper is shifted into closed position so that a complete inclosing wall surrounding the contractible plunger and tapering toward the lower end of the hopper, will be provided.

Mechanism is provided for providing a non-leaking joint between the carrier and top of the can while the can is being filled. The cans are usually provided with an annular lip. An annular rib fitting around the opening $c^3$ directs the material into the open end of the can. A gasket $c^4$ is secured to the carrier and is adapted to engage the top of the can when the can is held in raised position during a filling operation, by mechanism hereinafter described.

A plunger I is slidably mounted in post $a^3$ and is adapted to pass through correspondingly shaped openings in the carrier-guide B and the can-carrier respectively to engage the bottom of the can and force it upwardly so the top of the can will be held in position to receive material from the hopper and to engage gasket $c^4$. Escape ports $c^7$ are formed in the can-carrier, to permit the escape of air from the can into ports $c^6$ formed in the carrier-guide B and leading to the atmosphere. Resultantly, the air in the can displaced by the material escapes while the material is being forced into the can. This plunger is operated to hold the can when it has been shifted to receiving-position and to release the can when filled, so it may be removed from the carrier.

An ejector H (Fig. 9) is provided for removing the filled can from the carrier. This ejector is slidably mounted in a groove $h$ formed in the top of the table $a^2$ and is provided with a hook $h'$ at its inner end which is adapted to pass beneath the can, a groove $h^2$ being formed in the can-carrier and a groove $h^3$ in plunger I, so that said hook can pass beneath the can. The ejector-hook $h'$ engages the outer side of the can when it has been released and shifts the filled can from the carrier onto the table $a^2$ before the carrier is returned into position to receive the next can.

The plunger for forcing the material into the can is suspended from a cross-head $f^3$ which is secured to the upper ends of a pair of rods $f^{14}$ which are slidably mounted in lugs $f^{15}$ on the hopper and in lugs $f^{16}$ formed on the table $a^2$ and bed $a'$ respectively. The operating-mechanism for the plunger comprises (Fig. 10) a pair of gear-wheels 20 fixedly secured to a shaft 22 which is mounted in bearing-brackets 23 secured to table $a^2$ and bed $a'$. Each of said gear-wheels meshes with rack-teeth formed on one of the plunger rods $f^{14}$ respectively, and both of said gears are intermittently operated in opposite directions to raise and lower the plunger. The lowering movement occurs after the can-carrier and can have been shifted into position to receive a charge and the pivoted gate E' of the hopper has been operated into vertical position, and the raising movement occurs when the can has been filled. Shaft 22 is intermittently operated by a wheel 25 (Figs. 3 and 10) which is operated in opposite directions alternately and has a segmental series of gear-teeth 26 adapted to engage the teeth of a pinion 27 which is secured to and operates the shaft 22. Driver-wheel 25 is also provided with a concentric peripheral portion 28 adapted to engage a correspondingly formed recess 29 in pinion 27 to secure and lock the plunger F in its elevated and lowered positions respectively, to hold the plunger stationary while the can-carrier is being oscillated from either of its alternative positions to the other.

The mechanism for operating plunger I to hold the can in position to receive a charge through orifice $c^3$ in the can-carrier comprises a lever 30 pivoted in lugs $30^a$ and comprising an arm 31 (Fig. 7) which extends beneath the can lifting-plunger I and an arm 32 having a stud 33 secured to its distal terminal and adapted to be operated by a cam-wheel J which is rigidly secured to the plunger-operating shaft 22 and is rotated alternately in opposite directions with said shaft, being shifted approximately one complete revolution in each direction. Normally the can-lifter or plunger I is lowered and the rocker-lever 30 and its arms 31 and 32 are in the position illustrated in Figs. 2 and 7 of the drawings. The wheel J is provided with a concentric sectional-periphery 35, a hub 36 and a spring-pressed gate 37 which is pivotally connected to said wheel at its outer end and adapted to engage stud 33 to depress it and cause it to ride on the periphery 35 of the wheel during revolution of the wheel in one direction.

Normally wheel J, lever 30 and plunger I are in the position illustrated in Fig. 7. When wheel J commences to rotate, which occurs after the can-carrier has been shifted into position to bring the can into receiving-position (Figs. 1 and 8) and during the down stroke of the collapsible plunger F, stud 33 will be shifted downwardly by the gate 37 and directed onto periphery 35 of wheel J to cause lever 30 to lift plunger I so that the top of the can will be pressed against gasket $c^4$ and the can-mouth will be properly positioned to receive material from the hopper. Plunger I will be held in such operative position so long as periphery 35 holds lever 30 in such position. At the end of the down stroke of the plunger and a complete revolution of wheel J, stud 33 will again pass into position seen in Fig. 7, and the plunger I will be lowered to release the can. During the return stroke of the collapsible plunger F, wheel J is rotated in the reverse direction, and stud 33 of lever 30 will ride on hub 36 of wheel J and pass between the spring pressed gate 37 and the hub so that during the return stroke of plunger J the can-lifter I will remain in lowered position and inoperative. During this operation the can will be free to be ejected from the carrier and the carrier will be free to be rotated to normal position to receive another can. Plunger I is provided with a lug $i$ adapted to travel in a slot $i^2$ formed in the hollow post $a^3$ to hold said plunger against rotation.

A main drive-shaft K is mounted in suitable bearings $k'$ depending from table $a^2$. A clutch sleeve K' is slidably mounted on said shaft, being connected thereto by a key and way so it will rotate with the shaft at all times. Opposite one end of clutch-sleeve K', a beveled pinion $k^2$ is loosely mounted on the main drive-shaft, being provided with a sleeve or hub which is journaled in bearing $k'$. Opposite the other end of the clutch-sleeve, a pinion $k^3$ is similarly mounted. Each of these pinions is provided with a lug $k^8$ adapted to be driven in opposite directions and engaged by a spring-pressed pin $k^9$ in the contiguous ends of the clutch-sleeve K' respectively. A beveled gear-wheel $k^4$ is suitably mounted on a stud $k^5$ secured to table $a^2$ and has an annular series of teeth with which mesh, at opposite sides thereof, the pinions $k^2$ and $k^3$. The purpose of this construction is to drive the several mechanisms intermittently and in opposite directions. Wheel 25 of the plunger-operating gear-train is secured to rotate with pinion $k^2$.

Gear-wheel $k^4$ is provided on its upper face with a segmental series of gear-teeth $k^6$ (Fig. 16) adapted to mesh with a corresponding series of teeth $b^7$ on the can-carrier C (Figs. 3 and 4) to intermittently oscillate the latter from each of its alternative positions to the other. Wheel $k^4$ is also provided with a concentric periphery $k^{10}$ adapted to pass into notches $b^8$ and $b^9$ (Fig. 4) in the side of the can-carrier, and adjacent to teeth $b^7$, to lock the carrier in its alternative positions and hold the carrier stationary during the filling-operation and to permit the gear-wheel $k^4$ to operate continuously during the filling-operation.

The mechanism for controlling and operating clutch-sleeve K' to alternately rotate pinion $k^2$ and $k^3$ to drive the gear-trains in opposite directions, comprises a lever L which is pivoted to cross-frame $a^4$ as at $l$, and is provided with a stud $l'$ which extends into a central annular-groove in the clutch-sleeve K'. Said lever is provided with a handle $l^8$ whereby it may be manually shifted, and extensions or arms $l^3$ and $l^4$ having their terminals inclined or curved. A stud $k^{11}$ is secured to and rotated by gear-wheel $k^4$ (Fig. 5) for intermittently and alternately operating said lever. Normally, the lever is in centralized position, so the clutch-sleeve will be disconnected from pinions $k^2$, $k^3$. To cause the machine to operate, lever L is manually shifted to slide the clutch-sleeve into position to drive pinion $k^3$. Gear $k^4$ will then be rotated in the direction indicated by the arrow shown in dotted lines in Fig. 9 by pinion $k^3$ until stud $k^{11}$ engages lever-terminal $l^4$ and shifts the lever to its centralized position and disengages the clutch-sleeve from pinion $k^3$. During this step of the operation the can-carrier and the plunger-driving mechanism will be successively operated. When the clutch-sleeve is released and stud $k^{11}$ is adjacent lever-terminal $l^4$, a cam 40 secured to rotate with the clutch-sleeve, will strike said stud to shift the clutch-sleeve from its centralized position and into position to drive pinion $k^2$ which will drive the gear-trains in opposite direction to that effected by pinion $k^3$. When stud $k^{11}$ encounters and shifts lever-terminal $l^3$ it will shift lever L to disengage the clutch-sleeve from pinion $k^2$, so that the lever will be restored to its normal position after each cycle of operations of the mechanism, the drive-shaft K being driven continuously in one direction.

The mechanism for reciprocating the slidable ejector H comprises a gear-wheel $h^4$ (Figs. 9 and 16) mounted in a recess formed in the top of table $a^2$ and engaging rack-teeth $h^5$ formed at one side of the ejector-slide H. Gear-wheel $h^4$ is secured to a shaft $h^6$ which extends through the table and has secured to its lower end a pinion $h^7$ which is operated by teeth $h^9$ on ring $h^8$ secured to gear-wheel $k^4$. Ring $h^8$ is provided with a concentric peripheral portion adapted to enter a correspondingly shaped recess in pinion $h^7$ to hold the ejector in its alternate positions.

The operation of the improved machine will be as follows: Assuming the parts thereof to be in normal position (Figs. 2, 3, 7, 9) the can-carrier will be in position to close the bottom of the hopper so that a charge of material will be temporarily held therein and said carrier will be in position to permit a can to roll from run-way D into the rectangular opening $c'$ in the carrier. At the same time the movable wall or gate E' of the hopper will be in open position so that a charge of material may be conveniently delivered into the hopper (Fig. 7). The operator will then shift lever L to slide clutch sleeve K' into driving-relation with pinion $k^3$, thus causing said pinion to be operated in one direction by the main drive-shaft K. Said pinion $k^3$ will impart movement to gear-wheel $k^4$ the teeth $k^6$ of which will then engage teeth $b^2$ on the can-carrier and impart, approximately, one-fourth of a revolution to the can-carrier, thus causing the can in the carrier to be turned so the top-opening of the can will be positioned beneath the bottom of the hopper and to receive a charge of material from the hopper. Opening $c^3$ in the carrier will then be in registry with opening $b^3$ in the carrier-guide and with the bottom opening of the hopper, so that the material can flow from the hopper into the can. After the carrier reaches such position, concentric periphery $k^{10}$ will pass into notch $b^9$ (Fig. 4) and hold the carrier stationary until the filling operation has been completed. During the initial shift of the can-carrier, cam G will operate the pivoted wall or gate E' of the hopper into closed position (Fig. 8). These steps of the operation occur during approximately the first quarter revolution of the gear-wheel $k^4$. When pinion $k^3$ is connected to clutch-sleeve K', pinion $k^2$ will be simultaneously driven by gear-wheel $k^4$ in opposite direction to that in which gear $k^3$ and shaft K are driven. During that step of the operation in which the carrier is shifted from its normal to its operative position, the smooth peripheral portion 28 of wheel 25 will hold stationary gear 27, shaft 22, and the mechanisms controlled thereby and at the end of such step the teeth 26 of wheel 25 will engage the teeth of gear 27 and rotate shaft 22. When the carrier has brought the can into receiving-position, wheel 25 and gear 27 will be in relative position seen in Fig. 3. During the next quarter revolution of gear $k^4$, teeth 26 on wheel 25 will impart one revolution to shaft 22 in one direction, to effect the down stroke of the collapsible plunger F and the operation of the can-lifter I. During the initial operation of shaft 22, rocker lever 30 will be operated by cam-gate 37 to force the lever-stud 33 in engagement with the sectional periphery 35 of wheel J, thus causing the can-lifter I to force the can in the carrier upwardly against gasket $c^4$ to prevent escape of the material and causing the lifter to be held in such position until the can has been filled. This operation of shaft 22 will operate gears 20 (Figs. 3 and 10) to lower the collapsible plunger F. During this lowering operation, the plunger-members $f$, $f'$ and links $f^6$ will close the top of the hopper and force the non-fluid material through the lower end of the hopper-bottom, said members being gradually contracted by the tapered hopper walls as the plunger is lowered so it will pass through the hopper, forcing the compressed material through the reduced bottom opening of the hopper. This plunger is adapted to pass through openings $b^3$ and $c^3$ in the carrier-guide $b$ and can-carrier C respectively and into the can so that it will effectively eject the entire charge of material from the hopper into the can. As the plunger-members $f$, $f'$ are forced together by the inclined hopper-walls, stop $f^8$ protects the joint between the head-links $f^6$ and prevents the material from obstructing the folding of the links. At the end of the lowering operation of the plunger F and when the can has been filled, stud 33 of rocker-lever 30 passes off of periphery 35 of wheel J (Fig. 7) to cause plunger I to be lowered so that the can will be released. The ejector H is normally locked (Fig. 9) and after the can-carrier has shifted the can into receiving-position, teeth $h^9$ on link $h^8$ will engage the teeth of pinion $h^7$ and rotate shaft $h^6$ which will operate gear-wheel $h^4$ to slide the ejector through the carrier and beneath the can as illustrated in Fig. 8.

When the plunger F has been lowered, stud $k^{11}$ on gear wheel $k^4$ will encounter lever-terminal $l^4$ of the controller lever L and cause the clutch-sleeve K' to release pinion $k^3$ and shift the clutch-sleeve to its centralized or neutral position. Next, cam 40 on clutch-sleeve K' will engage stud $k^{11}$ which will slide said sleeve into driving-relation with pinion $k^2$, thus causing gear $k^4$ and the gear-train operated by shaft 22 to be rotated in reverse direction. During the initial reverse movement of the gear train, plunger F will be raised and again locked in raised position by wheels 25, 27 and the ejector slide H will be operated through the carrier to remove the filled can therefrom and on to table $a^2$, this operation occurring during the first quarter of a revolution in reverse direction imparted to the gear wheel $k^4$ and while the carrier is locked against rotation. Next, the can-carrier will be unlocked from said wheel $k^4$ and then rotated thereby, so the next can will roll into the opening $c'$ of the carrier and into position to close the bottom opening of the hopper. Movable wall E' of the hopper will be shifted into position to receive a charge of material by cam G before the carrier reaches its normal position. During this step of the operation, rocker-lever 30 will remain in position to permit the can-lifter I to remain lowered, the stud 33 engaging the hub 36 of wheel $g$ and passing between the gate 37 and said hub into normal position (Fig. 7). When the wheel $k^4$ has been reversely rotated to its normal position, stud $k^{11}$ thereon will engage lever-terminal $l^5$ (Fig. 10) and thus restore said lever to its neutral or centralized position to disconnect the operating-mechanisms from the main drive-shaft. All of the parts of the mechanisms will then have been restored to normal position.

The invention is not to be understood as restricted to the details set forth since these may be modified by the skilled mechanic within the scope of the appended claims without departing from the spirit of the invention. So also, the features of the invention may be adopted severally without adoption in entirety.

Having thus described the invention, what I claim as new and desire to secure by Letters Patent, is:—

1. In a filling-machine, the combination of a hopper for holding the material, means for holding a receptacle to be filled beneath said hopper, and a contractible plunger for forcing the material through said hopper comprising sections forming a plunger-head and pivotal connections between the sections.

2. In a filling-machine, the combination of a tapered hopper for holding the material, and a contractible plunger for forcing the material through said hopper to eject the material therefrom comprising sections forming a plunger head and connections between the sections which permit one of the sections to fold transversely to the plane of the end of the plunger head.

3. In a filling-machine, the combination of a tapered hopper for holding the material, means for holding a receptacle to be filled beneath said hopper, and a contractible plunger for forcing the material through said hopper to eject the material therefrom comprising sections forming a plunger head and pivotal connections between the sections.

4. In a filling-machine, the combination of a tapered hopper for containing the material, a contractible plunger adapted to be contracted by said hopper, and means for relatively shifting the hopper and plunger, one with respect to the other so that the plunger will be contracted by the hopper to discharge the material therefrom, said plunger comprising foldable sections having their outer portions formed to conform to and fit against the hopper-wall when the plunger is in different positions in the tapered hopper.

5. In a filling-machine, the combination of a tapered hopper for containing the material, means for holding a receptacle in position to receive a charge of material from the hopper, a contractible plunger adapted to be contracted by said hopper, and means for relatively shifting the hopper and plunger one with respect to the other so that the plunger will be contracted by the hopper to discharge the material therefrom, said plunger comprising sections forming the plunger head, and connections which permit them to swing relatively to one another.

6. In a filling-machine, the combination of a stationary tapered hopper, a contractible plunger adapted to be forced through said hopper to discharge the material therefrom comprising sections forming a plunger head and pivotal connections between the sections, and mechanism for operating said plunger in said hopper.

7. In a filling-machine, the combination of a stationary tapered hopper, means for holding a receptacle in position to receive a charge of material from the hopper, a contractible plunger adapted to be forced through said hopper to discharge the material therefrom, said plunger comprising foldable sections having their outer edge portions formed to conform to and fit against the hopper-wall when the plunger is in different positions in the tapered hopper, and mechanism for operating said plunger in said hopper.

8. In a filling-machine, the combination of a hopper having parallel sides and tapered ends, a contractible plunger adapted to travel in said hopper and to be contracted by the inclined end-walls thereof, and means for operating the plunger and hopper relatively to cause the material to be forced from the hopper.

9. In a filling-machine, the combination of a hopper having parallel sides and tapered ends, means for holding a receptacle in position to receive a charge from the hopper, a contractible plunger adapted to travel in said hopper and to be contracted by the inclined end-walls thereof, and means for operating the plunger and hopper relatively to cause the material to be forced from the hopper.

10. In a filling-machine, the combination of a stationary hopper having parallel sides and tapered end-walls, a contractible plunger adapted to travel in said hopper and to be contracted by the tapered end-walls thereof, and mechanism for operating the plunger and hopper relatively to cause the plunger to force the material from the hopper.

11. In a filling-machine, the combination of a stationary hopper having parallel sides and tapered end-walls, means for holding a receptacle in position to receive a charge from the hopper, a contractible plunger adapted to travel in said hopper and to be contracted by the tapered end-walls thereof, and mechanism for operating the plunger and hopper relatively to cause the plunger to force the material from the hopper.

12. In a filling-machine, the combination of a hopper having parallel sides and tapered ends, means for holding a receptacle in position to receive a charge from the hopper, a contractible plunger adapted to travel in said hopper and to be contracted by the inclined end-walls thereof and mechanism for operating the plunger longitudinally in the hopper to discharge the material therefrom.

13. In a filling-machine, the combination of an inclined-hopper, and a contractible plunger comprising a pair of yielding members adapted to be contracted by the hopper and foldable intermediate members.

14. In a filling-machine, the combination of an inclined-hopper, means for holding a receptacle in position to receive a charge of material from said hopper, and a contractible plunger comprising a pair of yielding members adapted to be contracted by the hopper and means for pushing the material from the space between said members as they are being brought together.

15. In a filling-machine, the combination of an inclined hopper, and a contractible plunger for forcing the material through said hopper and comprising a pair of members spring-pressed to engage the hopper-walls so they will be contracted thereby and means for pushing the material in the space between said members as they are contracted.

16. In a filling-machine, the combination of an inclined hopper, means for holding a receptacle in position to receive a charge of material from said hopper, and a contractible plunger for forcing the material through said hopper and comprising a pair of members spring-pressed to engage the hopper-walls so they will be contracted thereby and means for pushing the material in the space between said members as they are contracted.

17. In a filling-machine, the combination of an inclined hopper, and a contractible plunger comprising a pair of relatively movable members and foldable means extending between said members and forming a plunger-head for forcing the material through the hopper.

18. In a filling-machine, the combination of an inclined hopper, means for holding a receptacle in position to receive a charge of material from said hopper, and a contractible plunger comprising a pair of relatively movable members and foldable means extending between said members and forming a plunger-head for forcing the material through the hopper.

19. In a filling-machine, the combination of an inclined hopper, and a contractible plunger for forcing the material through said hopper and adapted to be contracted thereby and comprising a pair of members yieldingly sustained at their upper ends and foldable means extending between said members and coöperating therewith to form a contractible plunger-head.

20. In a filling-machine, the combination of an inclined hopper, means for holding a receptacle in position to receive a charge of material from said hopper, and a contractible plunger comprising a pair of relatively movable members and a pair of head-sections pivotally connected to said members respectively and connected together.

21. In a filling-machine the combination of an inclined hopper, means for holding a receptacle in position to receive a charge of material from said hopper, and a contractible plunger comprising a pair of relatively movable spring-pressed members and a pair of head-sections pivotally connected to said members respectively and connected together.

22. In a filling-machine, the combination of an inclined hopper, and a contractible plunger comprising a pair of relatively movable members and a pair of head-sections pivotally connected to said members and pivotally connected together.

23. In a filling-machine, the combination of an inclined hopper, and a contractible plunger comprising a pair of relatively movable spring-pressed members and a pair of head-sections pivotally connected to said members and pivotally connected together.

24. In a filling-machine, the combination of an inclined hopper, and a contractible plunger for forcing the material through said hopper comprising a pair of relatively movable members and a pair of head-sections pivotally connected to said members respectively and means for limiting the movement of said sections.

25. In a filling-machine, the combination of an inclined hopper, and a contractible plunger for forcing the material through said hopper and comprising a pair of relatively movable members, a pair of head-sections pivotally connected to said members respectively, said sections being pivotally connected together, and means beneath the joint between said sections for directing the material beneath the plunger-head.

26. In a filling-machine, the combination of an inclined hopper, means for holding a receptacle in position to receive a charge of material from said hopper, and a contractible plunger for forcing the material through said hopper and comprising a pair of relatively movable members, a pair of head-sections pivotally connected to said members respectively, said sections being pivotally connected together, and means beneath the joint between said sections for directing the material beneath the plunger-head.

27. In a filling-machine, the combination of an inclined hopper, and a contractible plunger comprising a pair of relatively movable members and a pusher for the material between the plunger-members for pushing the material from the space between said members as they are contracted.

28. In a filling-machine, the combination of an inclined hopper, means for holding a receptacle in position to receive a charge of material from said hopper, and a contractible plunger comprising a pair of relatively movable members and a pusher for the material between the plunger-members for pushing the material from the space between said members as they are contracted.

29. In a filling-machine, the combination of an inclined hopper, and a collapsible plunger comprising a pair of relatively movable members and a yielding pusher for the material between the plunger-members.

30. In a filling-machine, the combination of an inclined hopper, and a contractible plunger for forcing the material from the hopper, comprising a pair of relatively movable members, a pair of head-sections pivotally connected to said members respectively, and pivotally connected together, and a yielding pusher beneath the joint between said sections.

31. In a filling-machine, the combination of an inclined hopper, means for holding a receptacle in position to receive a charge of material from said hopper, and a contractible plunger for forcing the material from the hopper, comprising a pair of relatively movable members, a pair of head-sections pivotally connected to said members respectively, and pivotally connected together, and a yielding pusher beneath the joint between said sections.

32. In a filling-machine, the combination of an inclined hopper, and a plunger for forcing the material from the hopper comprising a pair of relatively movable members, a pair of head-sections pivotally connected to said members respectively, and pivotally connected together, and a pusher beneath the joint between said sections, said pusher being yieldingly held to restrict downward movement of said sections and having sliding contact therewith.

33. In a filling-machine, the combination of an inclined hopper, and a plunger for forcing the material from the hopper comprising a pair of relatively movable spring-pressed members, a pair of head-sections pivotally connected to said members respectively, and pivotally connected together, and a pusher beneath the joint between said sections, said pusher being yieldingly held to restrict downward movement of said sections and having sliding contact therewith.

34. In a filling-machine, the combination of a tapered hopper for holding the material having a movable wall, means for shifting said wall into and out of operative position and a contractible plunger for ejecting the material from the tapered hopper.

35. In a filling-machine, the combination of a tapered hopper for holding the material and comprising a wall pivoted at its lower end and a contractible plunger for ejecting the material from said tapered hopper.

36. In a filling-machine, the combination of a hopper for holding the material comprising a pivoted wall for forming one side of the hopper, mechanism for shifting said wall into and out of operative position, and a contractible plunger for ejecting the material from the hopper.

37. In a filling-machine, the combination of a tapered hopper for holding the material and comprising a wall pivoted near its lower end, a carrier for the receptacle to be filled, mechanism for shifting the pivoted wall into operative position when the carrier is operated to position the receptacle beneath the hopper, and a contractible plunger for ejecting the material from the hopper.

38. In a filling machine, the combination of a hopper for holding material, a plunger for ejecting the material from the hopper, a rotatable carrier for a can to be filled, mechanism for oscillating the carrier to turn a can into vertical position beneath the hopper and to retract it into position to receive a can, said carrier having an opening therein through which the material passes from the hopper into the can, and mechanism for operating the plunger.

39. In a filling machine, the combination of a hopper for holding material, a plunger for ejecting the material from the hopper, a rotatable carrier for a can to be filled, mechanism for oscillating the carrier to turn a can into vertical position beneath the hopper and to retract it into position to receive a can, said carrier having an opening therein through which the material passes from the hopper into the can, means for locking the carrier in one of its alternative positions, and mechanism for operating the plunger.

40. In a filling machine, the combination of a hopper for holding material, a plunger for ejecting the material from the hopper, a rotatable carrier for a can to be filled, mechanism for oscillating the carrier to turn a can into vertical position beneath the hopper and to retract it into position to receive a can, said carrier having an opening therein through which the material passes from the hopper into the can, means for locking the carrier in both of its alternative positions, and mechanism for operating the plunger.

41. In a filling machine, the combination of a hopper for holding material, a plunger for ejecting the material from the hopper, a rotatable carrier for a can to be filled, mechanism for oscillating the carrier to turn a can into vertical position beneath the hopper and to retract it into position to receive a can, said carrier having an opening therein through which the material passes from the hopper into the can, means for securing the can in receiving position in the carrier, mechanism for operating the securing-means through the bottom of the carrier and withdrawing it therefrom, to permit the carrier to be shifted, and mechanism for operating the plunger.

42. In a filling-machine, the combination of a hopper, a plunger for ejecting the material from the hopper, a carrier provided with an opening into which a receptacle may roll when the carrier is in one of its alternative positions, mechanism for intermittently oscillating the carrier to shift the receptacle into position to receive material through one of its ends, and mechanism for intermittently operating the plunger.

43. In a filling-machine, the combination of a hopper for containing the material, a plunger for ejecting the material from the hopper, a carrier having an opening into which the receptacle may roll when the carrier is in one of its alternative positions, mechanism for intermittently oscillating the carrier to shift the receptacle into position to receive material through one of its ends, and means for locking the carrier in one of its positions.

44. In a filling-machine, the combination of a hopper for containing the material, a plunger for ejecting the material from the hopper, a carrier having an opening into which the receptacle may roll when the carrier is in one of its alternative positions, mechanism for intermittently oscillating the carrier to shift the receptacle into position to receive material through one of its ends, and means for locking the carrier in both of its alternative positions.

45. In a filling-machine, the combination of a hopper for containing the material, a plunger for ejecting the material from the hopper, a carrier having an opening into which the receptacle may roll when the carrier is in one of its alternative positions, mechanism for intermittently oscillating the carrier to shift the receptacle into position to receive material through one of its ends, and means for securing the receptacle in receiving-position in the carrier.

46. In a filling-machine, the combination of a hopper for containing the material, a plunger for ejecting the material from the hopper, a carrier having an opening into which the receptacle may roll when the carrier is in one of its alternative positions, mechanism for intermittently oscillating the carrier to shift the receptacle into position to receive material through one of its ends, means for securing the receptacle in receiving-position in the carrier, and mechanism for intermittently operating said securing-means.

47. In a filling-machine, the combination of a hopper for containing the material, a plunger for ejecting the material from the hopper, a carrier having an opening into which the receptacle may roll when the carrier is in one of its alternative positions, mechanism for intermittently oscillating the carrier to shift the receptacle into position to receive material through one of its ends, and means for discharging the filled receptacle from the carrier.

48. In a filling-machine, the combination of a hopper for containing the material, a plunger for ejecting the material from the hopper, a carrier having an opening into which the receptacle may roll when the carrier is in one of its alternative positions, mechanism for intermittently oscillating the carrier to shift the receptacle into position to receive material through one of its ends, means for discharging a filled receptacle from the carrier, and mechanism for intermittently operating said discharging means.

49. In a filling-machine, the combination of a hopper for the material, a plunger for ejecting the material from the hopper, a guide, a can carrier rotatably mounted in said guide and having an opening therein adapted to be shifted beneath the bottom opening of the hopper, and mechanism for intermittently operating the carrier to bring said opening beneath the bottom opening of the hopper and the plunger to eject the material from the hopper.

50. In a filling-machine, the combination of a hopper for the material, a plunger for ejecting the material from the hopper, a guide, a can carrier rotatably mounted in said guide and having an opening therein adapted to be shifted beneath the bottom opening of the hopper, mechanism for intermittently operating the carrier to bring said opening beneath the bottom opening of the hopper and the plunger to eject the material from the hopper, and means for locking the carrier during the ejecting-stroke of the plunger.

51. In a filling-machine, the combination of a hopper for the material, a plunger for ejecting the material from the hopper, a guide, a can carrier rotatably mounted in said guide and having an opening therein adapted to be shifted beneath the bottom opening of the hopper, mechanism for intermittently operating the carrier to bring said opening beneath the bottom opening of the hopper and the plunger to eject the material from the hopper, and means for securing a receptacle in the carrier during an ejecting-stroke of the plunger.

52. In a filling machine, the combination of a hopper for containing the material, a plunger for ejecting the material from the hopper, a carrier for a can to be filled, gear mechanism for intermittently operating the carrier, comprising interlocking surfaces for holding the carrier stationary, and mechanism for operating said plunger.

53. In a filling machine, the combination of a hopper for containing the material, a plunger for ejecting the material from the hopper, a carrier for a can to be filled, gear mechanism for intermittently operating the carrier, comprising interlocking surfaces for holding the carrier stationary, and mechanism for operating said plunger, comprising gears having locking-surfaces for holding the plunger stationary.

54. In a filling machine, the combination of a hopper for containing the material, means for delivering a can into position to receive material from the hopper, a plunger for ejecting the material from the hopper, mechanism for driving said plunger and said means, a clutch for controlling the operation of said driving-means, and means for automatically stopping the driving-mechanism after each filling operation.

55. In a filling-machine, the combination of a hopper for containing the material, a plunger for ejecting the material therefrom, means for delivering a can into position to receive a charge of material, mechanism for operating the plunger to force a charge into the can, mechanism for removing the can after it has been filled, a clutch for the operating mechanism and automatic means for operating the clutch to discontinue the operation of the machine after each cycle of operations.

CLARENCE F. COLBERT.

Witnesses:
FRED GARLAND,
LEONE S. RUSSELL.